United States Patent
Eggleston

(10) Patent No.: US 9,383,026 B2
(45) Date of Patent: Jul. 5, 2016

(54) METHOD OF REPAIRING LEAKY HVAC SERVICE VALVES AND AN IMPROVED HVAC SERVICE VALVE WHICH PREVENTS LEAKS

(71) Applicant: Allen A. Eggleston, Mayesville, SC (US)

(72) Inventor: Allen A. Eggleston, Mayesville, SC (US)

( * ) Notice: Subject to any disclaimer, the term of this patent is extended or adjusted under 35 U.S.C. 154(b) by 6 days.

(21) Appl. No.: 14/445,272

(22) Filed: Jul. 29, 2014

(65) Prior Publication Data
US 2015/0267829 A1   Sep. 24, 2015

Related U.S. Application Data

(60) Provisional application No. 61/967,462, filed on Mar. 19, 2014.

(51) Int. Cl.
| | |
|---|---|
| F16K 43/00 | (2006.01) |
| F16K 51/00 | (2006.01) |
| F16L 55/10 | (2006.01) |
| F16K 25/00 | (2006.01) |
| F16K 27/00 | (2006.01) |

(52) U.S. Cl.
CPC ............... F16K 25/00 (2013.01); F16K 27/00 (2013.01); *Y10T 137/0452* (2015.04); *Y10T 137/6065* (2015.04); *Y10T 137/6069* (2015.04); *Y10T 137/6113* (2015.04)

(58) Field of Classification Search
CPC ....... F16K 27/00; F16K 27/02; F16K 27/065; F16K 5/0471; F16K 5/0478; F16K 5/0485; F25B 45/00; Y10T 137/0452; Y10T 137/6065; Y10T 137/6069; Y10T 137/6109; Y10T 137/6113; Y10T 29/49719
See application file for complete search history.

(56) References Cited

U.S. PATENT DOCUMENTS

| | | | | | |
|---|---|---|---|---|---|
| 2,138,503 | A | * | 11/1938 | O'Brien | F16K 43/001 137/360 |
| 3,689,979 | A | * | 9/1972 | Palat | B23P 19/00 137/315.41 |
| 3,916,947 | A | * | 11/1975 | Holmes | F25B 41/003 137/360 |
| 4,644,973 | A | * | 2/1987 | Itoh | F24F 1/0003 137/866 |
| 5,188,144 | A | * | 2/1993 | Radossi | F16K 5/0478 137/315.25 |
| 5,947,443 | A | * | 9/1999 | Shellenbarger | F16K 5/0478 251/181 |
| 5,957,147 | A | * | 9/1999 | Hubbell, Jr. | F16L 35/00 137/15.18 |
| 6,269,840 | B1 | * | 8/2001 | Beaver | B60H 1/00485 137/596.2 |
| 6,546,952 | B1 | | 4/2003 | Martin et al. | |

* cited by examiner

*Primary Examiner* — Marina Tietjen
*Assistant Examiner* — Seth W Mackay-Smith
(74) *Attorney, Agent, or Firm* — James Curley

(57) ABSTRACT

In a HVAC service valve comprised of a valve body, the valve body defining a cylindrical cavity for receiving a valve stem, the valve stem being rotatably positioned in the cylindrical cavity of the valve body so as to open and close the service valve when the valve stem is rotated counterclockwise and clockwise respectively, the valve stem having a top portion, the top portion being provided with an O-ring to seal any fluid passageway between the top portion of the valve stem and an inner wall of the cylindrical cavity of the valve body, the valve body further having an upper portion, the upper portion being provided with means for preventing the valve stem from being forced out of the valve body due to refrigerant pressure, the improvement being an elastic seal ring positioned above the top portion of the valve stem and below the means for preventing the valve stem from being forced out of the valve body, the elastic seal ring being sized to fit tightly against the inner wall of the cylindrical cavity.

14 Claims, 4 Drawing Sheets

METHOD OF REPAIRING LEAKY HVAC SERVICE VALVES AND AN IMPROVED HVAC SERVICE VALVE WHICH PREVENTS LEAKS

CROSS-REFERENCE TO PRIORITY APPLICATIONS

This application claims the benefit of U.S. Patent Application No. 61/967,462 for A Method Of Repairing Leaky HVAC Service Valves And An Improved HVAC Service Valve Which Prevents Leaks (filed Mar. 19, 2014), the foregoing patent application is hereby incorporated by reference in its entirety.

FIELD OF THE INVENTION

The invention relates to a method of repairing leaky HVAC services valves and an improved HVAC service valve which prevents refrigerant leaks.

BACKGROUND OF THE INVENTION

Air Conditioning and other HVAC units for homes and buildings typically have a service valve in the system for charging the system and for recovery of refrigerant. Additionally, the service valve can act as a shut-off to the system and for allowing the flow of refrigerant through the system. The service valve also provides access to hook up manifold gages for servicing the system.

A typical service valve is described for example in U.S. Pat. No. 6,546,952 ('952 patent) incorporated herein by reference. The '952 patent teaches, an air conditioner service valve, comprising: a valve body, the body defining a valve cavity for receiving a valve stem. The valve stem is threadably engaged to the inside of the valve body so that when the valve stem is rotated about its longitudinal access, the valve stem moves inwardly or outwardly depending on the direction of rotation. An O-ring is typically provided around a top portion of the valve stem and tight contact with the inner wall of the cylindrical cavity to enact a seal between the top portion of the valve stem and the inner wall of the valve body to prevent refrigerant leaks, A service valve cap engages the outside of the valve body and encapsulates the cylindrical cavity and the valve stem in order to prevent dirt and moisture from entering the interior of the service valve.

Refrigerant may exert high pressures on the valve stem and valve body, possibly forcing the valve stem out of the valve body, resulting in loss of refrigerant and even the valve stem. This situation can happen most often if the valve stem is rotated outwardly so far as to disengage with the threads of the valve body. Therefore, typical service valves are provided with means of preventing the valve stem from being forced out of the valve body. The '952 patent solves this problem by providing the valve body to include a deformable collar formed on a top portion of the valve body and a first attachment mechanism on an exterior portion of the valve body, the collar selectively deformable between an installation and a retention position, the collar extending a first distance longitudinally from the attachment mechanism when the collar is in the installation position; and a sealing cap for sealing the valve cavity including a base portion and a sealing portion longitudinally extending from the base portion, an inner surface of the sealing portion including a shoulder having an inner portion and a second attachment mechanism for engaging the first attachment mechanism when the collar is in said retention position, wherein the shoulder inner portion abuts a distal end of the deformable collar in the installation position which prevents the second attachment mechanism from engaging the first attachment mechanism.

An older style service valve is similar to that of the '952 patent except it provides a snap ring positioned above the valve stem in an annular grove in the inner wall of the cylindrical cavity as the means for preventing the valve stem from being forced out of the valve body. This type of valve is also described in the '952 patent and illustrated in FIG. 1 of the '952 patent.

Service valves have been known to leak after even just a few years in service, or even when they are practically brand new. Causes of premature leaking may be due to overheating of the valve parts during manufacture or during installation. Alternatively, the O-ring around the stem deteriorates. Regardless of the cause, most of the refrigerant leaking occurs at the O-ring.

Attempts to repair leaky service valves are known in the art. However, most of these methods entail shutting down the air conditioning unit and removing the refrigerant, which can be costly to replace. For example, one way to repair a leaky service valve is to by-pass the valve entirely or to eliminate it from the system. This involves removing the refrigerant, cutting pipes, braising and welding new pipes, and then recharging the system with refrigerant. Likewise, if the old valve is replaced with a new valve, the operation involves removing the refrigerant, cutting out the old service valve, braising and welding, and finally recharging the system. Some service technicians may opt to replace just the O-ring in the valve-stem, which is where most leaks originate. While replacing the O-ring does not require cutting the lines and welding, the refrigerant still has to be removed from the system and then recharged, which is costly. In addition, only older style service valves allow the valve stem to be removed giving access to the O-ring.

Attempts to repair leaky service valves without removing the refrigerant from the system usually involve trying to make the cap leak-proof by coating the valve body threads with thread seal tape, thread lock compounds, and the like. However, the cap is not designed to be leak-proof or to withstand pressure exerted from leaking refrigerant. While these solutions may work temporarily, they rarely provide a long-term solution. In fact service valve caps have been known to deform and crack under the pressure of the leaking refrigerant.

It is an object of the present invention to provide an improved HVAC service valve which prevents refrigerant leaks emanating from the O-ring region of a service valve and a method of repairing leaky service valves of either type described hereinbefore quickly and at a low cost, without cutting pipes, and without losing or having to replace refrigerant in the system because of the repair.

BRIEF DESCRIPTION OF THE INVENTION

The objects described hereinbefore are satisfied with the present invention. The method of repairing a leaky HVAC service valve according to the present invention allows leaky service valves to be repaired quickly, inexpensively and without removing refrigerant from the system. An improved HVAC service valve according to the present invention prevents refrigerant leaks and is comprised of an elastic seal ring and a rigid retainer ring which are inserted above a valve stem in a service valve body.

An HVAC service valve is generally is comprised of a valve body, the valve body defining a cylindrical cavity for receiving a valve stem, the valve stem being rotatably positioned in the cylindrical cavity of the valve body so as to open and close the valve to refrigerant passage when the stem is rotated counterclockwise and clockwise respectively. The valve stem has a top portion and is provided with an O-ring around the top portion to seal any fluid passageway between the top portion of the valve stem and an inner wall of the cylindrical cavity of the valve body. The valve body further has an upper portion, the upper portion being provided with means for preventing the valve stem from being forced out of the valve body due to refrigerant pressure, especially when the valve stem is rotated too far counterclockwise. In some HVAC service valves, the means for preventing the valve stem from being forced out of the valve body is a snap ring placed above the valve stem in an annular groove on the inner wall of the valve body. In more recent valves, the upper portion of the valve body is provided with a dome-shaped collar which prevents the valve stem from exiting the valve body. A cap is provided to cover the valve body and cylindrical cavity of the valve body and is usually engaged by threads on the interior of the cap and on exterior of the top portion of the valve body.

The inventor, having observed many leaky HVAC service valves where the leak originates near the O-ring on the upper portion of the valve stem, has found that the HVAC service valve can be sealed from leaking above the valve stem and under the means for preventing the valve stem from being forced out of the valve body, without emptying the system of refrigerant. Specifically, the inventor has found that placing an elastic seal above the top portion of the valve stem but below the means for preventing the valve stem from being forced out of the valve body is effective in repairing leaky service valves and providing a HVAC service valve which will not leak. The elastic seal ring is positioned above the valve stem and sized to tightly contact the inner wall of the cylindrical cavity defined by the valve body. The elastic seal ring is especially effective for sealing leaks when the valve stem is back-seated against the means for preventing the valve stem from being forced out of the valve body with the elastic seal intervening.

In one embodiment, the means for preventing the valve stem from being forced out of the valve body is dome-shaped collar provided at the upper portion of the valve body. In this style valve, the improved HVAC service valve may further comprise a rigid retainer ring inserted inside the elastic seal ring in order to prevent the elastic seal ring from collapsing inward due to pressure from either back-seating the valve stem or pressure from refrigerant.

In another embodiment, the means for preventing the valve stem from being forced out of the valve body is a snap-ring positioned above the valve stem in an annular groove on the inner wall of the cylindrical cavity of the valve body. In this style valve, the improved HVAC service valve further comprises a rigid retainer ring positioned on top of the elastic seal ring and under the snap-ring. The rigid retainer ring is sized to fit snugly in the cylindrical cavity of the valve body. The valve stem, as described hereinbefore, is back-seated against the snap-ring with the elastic seal ring and rigid retainer ring intervening.

The elastic seal ring in any of the embodiments is preferably made from polychloroprene, commonly named neoprene, which is resistant to degradation from many refrigerants, and is the same material that many O-rings are made of. In the alternative, the elastic seal ring may be selected from the group of rubbers, elastic and deformable plastics, thermoset polymers and thermoplastic polymers. While less preferable, O-rings may be employed for use as the elastic seal ring. Preferably, the elastic seal ring is circular in shape, but has a rectangular cross-section. The rectangular cross-section ensures that there is the maximum surface contact possible between the elastic seal ring and the inner wall of the cylindrical cavity of the valve body.

The rigid retainer ring and any of the embodiments is preferably made of a metal such as aluminum, but may also be made of other rigid materials. Preferably, the rigid retainer ring has a rectangular cross-section to match that of the elastic seal ring. In one embodiment, the rigid retainer ring has an outside diameter at least as great as an inside diameter of the elastic seal ring. In another embodiment, the rigid retainer ring has an outside diameter substantially the same as an inner diameter of the cylindrical cavity of the valve body.

In one embodiment of the present invention, the rigid retainer ring has an outside diameter greater than that of the inside diameter of the elastic seal ring. When the rigid retainer ring is inserted inside the elastic seal ring, the diameter of the rigid retainer ring being slightly greater than the inside diameter of the elastic seal ring, the elastic seal ring is forced to expand towards and against the inner wall of the cylindrical cavity of the valve body, thereby creating a tight seal to prevent leaking refrigerant flow.

Typically the valve stem is rotated clockwise to close the valve and counterclockwise to open the valve. The turning is accomplished by a turning tool, usually a hex wrench, the valve stem being provided with a socket head on an uppermost surface of the valve stem. The rigid retainer ring in all embodiments has an inner diameter large enough for the turning tool to be inserted through the rigid retainer ring and into the socket head. In a similar fashion, the elastic seal ring has an inner diameter large enough for the turning tool to be inserted through the elastic seal ring and into the socket head.

In a further embodiment, the present invention provides a method of repairing a leaky HVAC service valve where the leak originates near the O-ring on the valve stem, comprising the following steps: removing the cap from the service valve; rotating the valve stem clockwise; inserting an elastic seal ring above the top portion of the valve stem and below the means for preventing the valve stem from being forced out of the cylindrical cavity; and back-seating the valve stem against the means for preventing the valve stem from being forced out of the cylindrical cavity by rotating the valve stem counterclockwise, thereby pushing the elastic seal ring against the means for preventing the valve stem from being forced out of the cylindrical cavity.

In another embodiment, the method of repairing a leaky HVAC service valve wherein the step of rotating the valve stem clockwise further includes rotating the valve clockwise a sufficient amount to accomplish the inserting the elastic seal ring step.

In another embodiment of the present invention, the method of repairing a leaky HVAC service valve further comprises the additional step replacing the cap on the service valve.

In another embodiment of the present invention, the method of repairing a leaky HVAC service valve further comprises the additional step of inserting a rigid retainer ring inside elastic seal ring, before the back-seating step.

In further embodiment of the present invention, the rigid retainer ring has an outside diameter greater than an inside diameter of the elastic seal ring. In the method of repairing a leaky HVAC service valve described hereinabove, the inserting a rigid retainer ring inside the elastic seal ring step includes expanding the elastic seal ring towards an inner wall of the cylindrical cavity. Thus, when the rigid retainer ring is inserted inside the elastic seal ring, the diameter of the rigid retainer ring being slightly larger than the inside diameter of the elastic seal ring, the elastic seal ring is forced to expand towards and against the inner wall of the cylindrical cavity of the valve body, thereby creating a tight seal to prevent leaking refrigerant flow.

In older service valves where the means to prevent the valve stem from being forced out of the valve body is a snap ring as described hereinbefore, the method of repairing a leaky service valve comprises the additional steps of removing the snap ring after the first rotating step; inserting a rigid retainer ring on top of the elastic seal ring before the back-seating step; and replacing the snap ring after inserting the rigid retainer ring and before the back-seating step.

BRIEF DESCRIPTION OF THE DRAWINGS

Further features and advantages will be more apparent from the detailed description of some preferred but non-exclusive embodiments of the service valve repair system and method of repairing such service valves according to the present invention. Such a description will be set forth hereinafter with reference to the accompanying drawings, given only for illustrative and thus non-limiting purposes, in which.

DETAILED DESCRIPTION OF THE DRAWINGS

Figure 1:
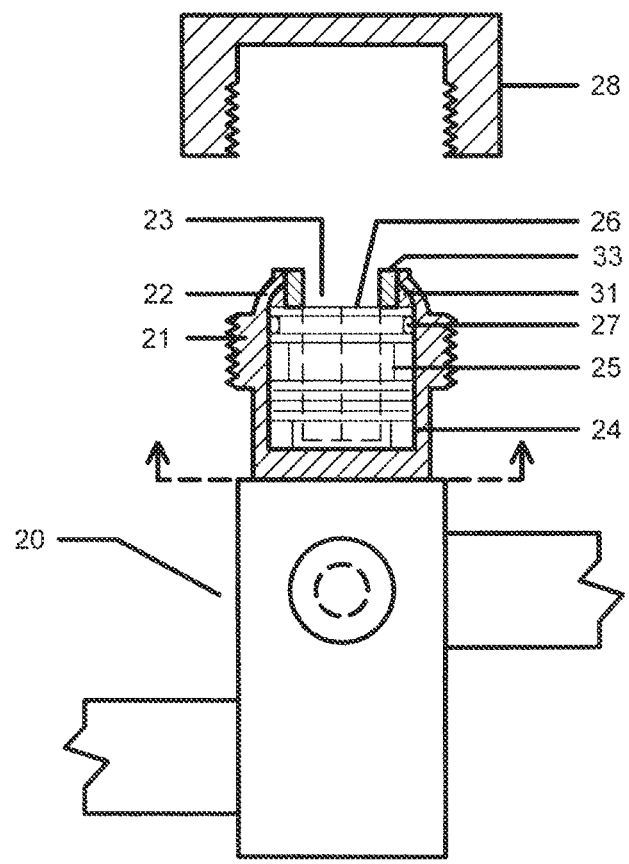
FIG. 1 is a perspective view of one embodiment of the present invention.

The present invention will now be described more fully hereinafter with reference to the accompanying drawings in which preferred embodiments of the invention are shown. This invention however may be embodied in many different forms and should not be construed as limited to the embodiments set forth herein. In the drawings, like numbers refer to like elements throughout.

Figure 2:
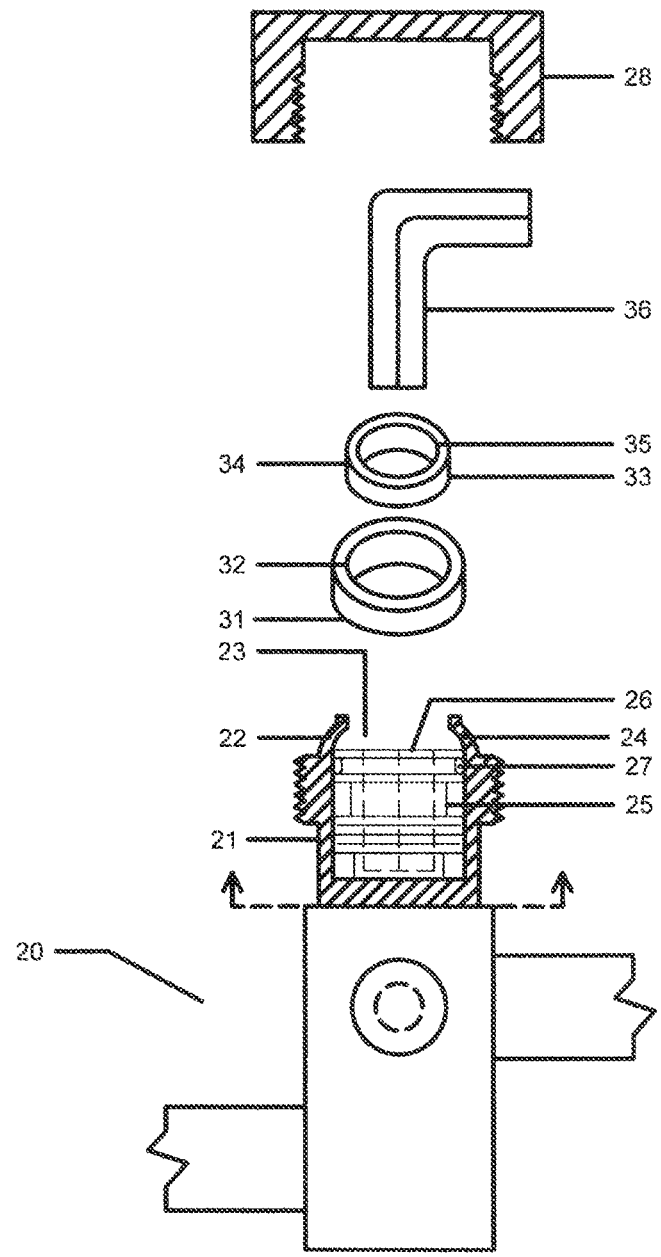
FIG. 2 is an expanded view of several of the components illustrated in FIG. 1 for clarity.

Referring now to FIG. 1 and FIG. 2, which show a compressed and an expanded view of the invention respectively, an HVAC service valve (20) is comprised of a valve body (21) with a cylindrical cavity (23) for receiving a valve stem (25), the valve stem (25) being rotatably positioned in the cylindrical cavity (23) of the valve body (21). The valve stem (25) is threadably engaged to the valve body (21) so that when the valve stem (25) is rotated, the HVAC service valve (20) opens or closes allowing or shutting off refrigerant flow. The valve stem (25) has a top portion (26) which is provided with an O-ring (27) which maintains contact with the cylindrical cavity (23) in order to prevent refrigerant leaks. The valve body (21) has an upper portion (22) which prevents the valve stem (25) from being forced out of the valve body due to refrigerant pressure. The upper portion (22) is curved to form a dome-shaped collar such that the cylindrical cavity (23) is sufficiently closed off so that the valve stem (25) can not pass through the upper portion (22). The HVAC service valve (20) is also provided with a cap (28) which threadably engages the valve body (21)

The improvement on the HVAC service valve (20) is comprised of an elastic seal ring (31) positioned above the top portion (26) of the valve stem (25) and below the upper portion (22) of the valve body (21). The elastic seal ring (31) is sized to fit tightly against an inner wall (24) of the cylindrical cavity (23). The elastic seal ring (31) has an inner diameter (32). A rigid retainer ring (33) is positioned inside the elastic seal ring (31). The rigid retainer ring (33) prevents the elastic seal ring (31) from collapsing in the event there is pressure from refrigerant. The valve stem (25) is back-seated against the upper portion (22) of the valve body (21) with the elastic seal ring (31) and the rigid retainer ring (33) intervening. The rigid retainer ring (33) prevents the elastic seal ring (31) from collapsing in on itself when pressure from back-seating the valve stem (25) is applied to the elastic seal ring (31).

The rigid retainer ring (33) preferably has a height equal to or greater than a height of the elastic seal ring (31). The outer diameter (34) of the rigid retainer ring (33) is sized sufficiently small as to be able to pass through the upper portion (22) of the valve body (21). The outer diameter (34) of the rigid retainer ring (33) is sized to be at least as great as the inner diameter (32) of the elastic seal ring (31).

A turning tool (36) used to turn the valve stem (25) is shown in the FIG. 2. The rigid retainer ring (33) has an inner diameter (35) sufficient for the turning tool (36) to pass through the inner diameter (35) of the rigid retainer ring (33). The valve stem (25) is provided with a socket head (not shown) for receiving the turning tool (36).

Figure 3:
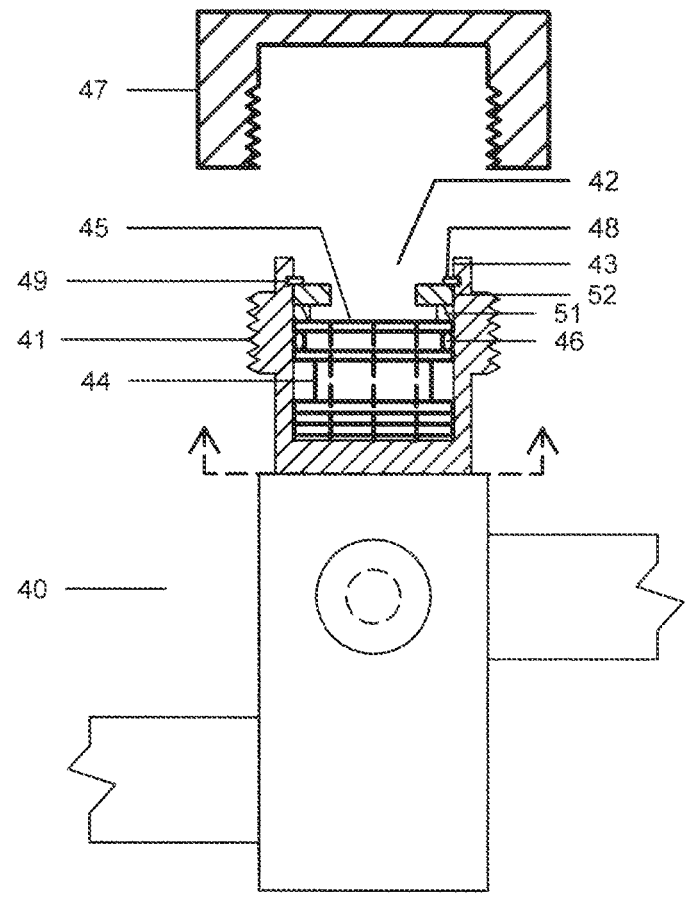
FIG. 3 illustrates another embodiment of the present invention in which the means for preventing the valve stem from being forced out of the valve body is a snap ring.

In older style HVAC service valves, the means for preventing the valve stem from being forced out of the valve body is comprised of a snap ring positioned above the valve stem in an annular groove on an inner wall of the cylindrical cavity. FIG. 3 illustrates an embodiment of the present invention in the older style HVAC service valve just described. Referring to FIG. 3, an HVAC service valve (40) is comprised of a valve body (41) with a cylindrical cavity (42) for receiving a valve stem (44), the valve stem (44) being rotatably positioned in the cylindrical cavity (42) of the valve body (41). The valve stem (44) is threadably engaged to the valve body (41) so that when the valve stem (44) is rotated, the HVAC service valve (40) opens or closes allowing or shutting off refrigerant flow. The valve stem (44) has a top portion (45) which is provided with an O-ring (46) which maintains contact with the cylindrical cavity (42) in order to prevent refrigerant leaks. The valve body (41) is provided with an annular groove (49) on the inner wall (43) of the cylindrical cavity (42) of the valve body (41). A snap ring (48) is positioned in the annular groove (49) to prevent the valve stem (44) from being forced out of the valve body (41) due to refrigerant pressure. The HVAC service valve (40) is also provided with a cap (47) which threadably engages the valve body (41)

The improvement on the HVAC service valve (40) is comprised of an elastic seal ring (51) is positioned against the inner wall (43) of the cylindrical cavity (42), above the valve stem (44) and below the annular groove (49) and the snap ring (48). The rigid retainer ring (52) is positioned above the elastic seal ring (51) and below the snap ring (48). When the valve stem (44) is back-seated against the snap ring (48) with the elastic seal ring (51) and the rigid retainer ring (52) intervening, the elastic seal ring (51) will compress and seal any leaky passageway around the valve stem (44).

Figure 4:
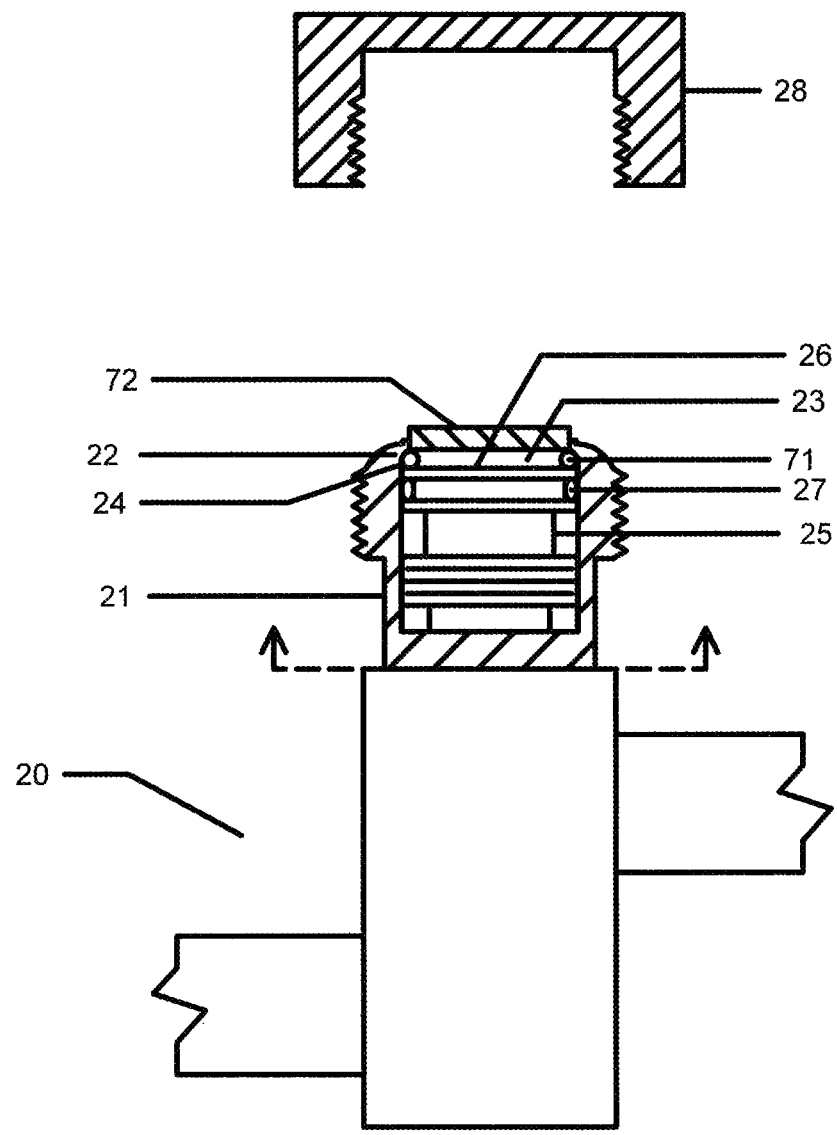
FIG. 4 illustrates a further embodiment of the present invention in which the valve body has the same structure as that of FIG. 1, and the seal is accomplished without a rigid retainer ring.

Certain HVAC service valves are more compact than those previously described hereinbefore. The structure of the HVAC service valve is the same as illustrated in FIG. 1, however the smaller size prohibits the insertion of a retainer ring. However, the invention can be accomplished with a modified elastic seal ring and disk. FIG. 4 illustrates the invention in conjunction with such a compact HVAC service valve. Referring now to FIG. 4, the elastic seal ring (71), which is preferably a standard O-ring, is positioned just under the upper portion (22) of the valve body (21) and above the valve stem (25) and against the inner wall of the cylindrical cavity (24). Inserted above the elastic seal (71) is a rubber disk (72). Preferably, the rubber disk (72) is made of Neoprene and extends above the top portion (22) of the valve body (21). When the cap (28) is engaged tightly on the valve body, the cap (28) puts pressure on the rubber disk (72), which in turn squeezes the elastic seal ring (71) into any potential leak areas around the valve stem (25), thus sealing any refrigerant leaks.

One skilled in the art can appreciate that there are numerous embodiments to provide an improved HVAC service valve and a method of repairing a leaky HVAC service valve according to the present invention. Other modifications and embodiments of the present invention are possible. It is to be understood that the invention is not limited to the embodiments shown and described herein.

I claim:

1. A method of repairing a refrigerant leak in a HVAC service valve, the service valve being of the type which has a cap, a valve body defining a cylindrical cavity for receiving a rotatable valve stem, and means provided on an upper portion of the valve body for preventing the valve stem from being forced out of the cylindrical cavity, comprising, in the following sequence:
   a. removing the cap from the service valve;
   b. rotating the valve stem clockwise;
   c. inserting an elastic seal ring above a top portion of the valve stem and below the means for preventing the valve stem from being forced out of the cylindrical cavity; the rotating the valve stem clockwise step being a sufficient amount of rotation to accomplish the inserting the elastic seal ring step;
   d. inserting a rigid retainer ring inside the elastic seal ring, the rigid retainer ring having an outer diameter at least as great as an inner diameter of the elastic seal ring;
   e. back-seating the valve stem against the means for preventing the valve stem from being forced out of the cylindrical cavity by rotating the valve stem counterclockwise, thereby pushing the elastic seal ring against the means for preventing the valve stem from being forced out of the cylindrical cavity; and
   f. replacing the cap on the service valve after the back-seating step.

2. The method of claim 1, wherein the rigid retainer ring has an outside diameter greater than an inside diameter of the elastic seal ring; and wherein the inserting a rigid retainer ring inside the elastic seal ring step includes expanding the elastic seal ring towards an inner wall of the cylindrical cavity.

3. The method of claim 1, wherein the means for preventing the valve stem from being forced out of the cylindrical cavity is a snap ring positioned above the valve stem in an annular groove on an inner wall of the cylindrical cavity, the method further comprising the steps: removing the snap ring from above the valve stem after rotating the valve stem clockwise; inserting a rigid retainer ring over the elastic seal ring; and replacing the snap ring into the annular groove after inserting the rigid retainer over the elastic seal ring.

4. The method of claim 1, further comprising the additional step of inserting a rubber disk above the elastic seal ring in the cylindrical cavity, the rubber disk extending above the top portion of the valve body; and then the step of replacing the cap on the service valve.

5. In a HVAC service valve comprised of a cap; a valve body; the valve body defining a cylindrical cavity for receiving a valve stem; the valve stem being rotatably positioned in the cylindrical cavity of the valve body so as to open and close the service valve when the valve stem is rotated counterclockwise and clockwise respectively; the valve stem having a top portion; the top portion being provided with an O-ring to seal any fluid passageway between the top portion of the valve stem and an inner wall of the cylindrical cavity of the valve body; the valve body further having an upper portion; the upper portion being provided with means for preventing the valve stem from being forced out of the valve body due to refrigerant pressure; the improvement being an elastic seal ring positioned above the top portion of the valve stem and below the means for preventing the valve stem from being forced cut of the valve body, the elastic seal ring being sized to fit tightly against the inner wall of the cylindrical cavity, the elastic seal ring having an inner diameter; and wherein the improvement further comprises a rigid retainer ring positioned inside the elastic seal ring, the rigid retainer ring sized to fit tightly in the inner diameter of the elastic seal ring.

6. The HVAC service valve of claim 5, wherein the rigid retainer ring is metallic.

7. The HVAC service valve of claim 5, wherein the rigid retainer ring has an outside diameter greater than the inner diameter of the elastic seal ring.

8. The HVAC service valve of claim 5, wherein the elastic seal ring is selected from the group of polychloroprene, rubbers, deformable plastic, deformable thermoset polymers and thermoplastic polymers.

9. The HVAC service valve of claim 5, wherein the elastic seal ring has a height and the rigid retainer ring has a height, the height of the rigid retainer ring being at least as great as the height of the elastic seal ring.

10. The HVAC service valve of claim 5, wherein the valve stem is in contact with the elastic seal and the rigid retainer ring; and wherein the rigid retainer ring is in contact with the means for preventing the valve stem from being forced out of the valve body.

11. The HVAC service valve of claim 5, wherein the rigid retainer ring has a rectangular cross-section.

12. In a HVAC service valve comprised of a cap; a valve body; the valve body defining a cylindrical cavity for receiving a valve stem; the valve stem being rotatably positioned in the cylindrical cavity of the valve body so as to open and close the service valve when the valve stem is rotated counterclockwise and clockwise respectively; the valve stem having a top portion; the top portion being provided with an O-ring to seal any fluid passageway between the top portion of the valve stem and an inner wall of the cylindrical cavity of the valve body; the valve body further having an upper portion; the upper portion being provided with means for preventing the valve stem from being forced out of the valve body due to refrigerant pressure; the improvement comprises an elastic seal ring positioned above the top portion of the valve stem and below the means for preventing the valve stem from being forced out of the valve body, the elastic seal ring being sized to fit tightly against the inner wall of the cylindrical cavity; and a rigid retainer ring positioned on top of the elastic seal ring, the rigid retainer ring sized to fit snugly in the cylindrical cavity of the valve body.

13. The HVAC service valve of claim 12, wherein the valve stem is in contact with the elastic seal ring; and wherein the rigid retainer ring is in contact with the elastic seal ring and with the means for preventing the valve stem from being forced out of the valve body.

14. The HVAC service valve of claim 12, wherein the rigid retainer ring has a rectangular cross-section.

* * * * *